United States Patent [19]

Dolberg et al.

[11] 4,265,269

[45] May 5, 1981

[54] DEVICE FOR AUTOMATICALLY CUTTING OFF DAMAGED BRANCHES OF PNEUMATIC AND HYDRAULIC SYSTEMS

[76] Inventors: Vladimir I. Dolberg, ulitsa Khalturina, 8, kv. 9; Igor V. Yarovoi, ulitsa Primakova, 12, kv. 74; Mikhail I. Dronin, ulitsa Zygina, 42, kv. 37, all of Poltava, U.S.S.R.

[21] Appl. No.: 28,396

[22] Filed: Apr. 9, 1979

[51] Int. Cl.$^3$ ............................................. G05D 7/00
[52] U.S. Cl. .................................. 137/118; 303/84 R; 303/84 A
[58] Field of Search ..................... 137/118, 119, 101; 303/84 R, 84 A

[56] References Cited

U.S. PATENT DOCUMENTS

| | | | |
|---|---|---|---|
| 2,195,214 | 3/1940 | Jacob | 303/84 A |
| 2,311,955 | 2/1943 | Merker | 303/84 A |
| 2,534,871 | 12/1950 | Lichtman | 137/118 |
| 2,854,016 | 9/1958 | Margida | 137/118 |
| 3,191,614 | 6/1965 | Feibush | 137/118 |
| 3,481,358 | 12/1969 | Gardner | 137/118 |
| 3,570,523 | 3/1971 | Pauliukonis | 137/119 |

FOREIGN PATENT DOCUMENTS

| | | | |
|---|---|---|---|
| 1282392 | 11/1968 | Fed. Rep. of Germany | 137/118 |
| 2076856 | 9/1971 | France . | |
| 837532 | 6/1960 | United Kingdom | 137/119 |

*Primary Examiner*—Gerald Goldberg
*Assistant Examiner*—Denis E. Corr
*Attorney, Agent, or Firm*—Steinberg & Raskin

[57] ABSTRACT

The device has a casing with an inlet chamber and outlet chambers communicating with one another through a passage in which is loosely mounted a pilot valve having a piston rod with pistons secured at the ends thereof and defining with the casing shut-off valves of the outlet chambers. According to the invention, the pilot valve has at least one additional piston with a cross-sectional area which is smaller than the cross-sectional area of each of said pistons, the additional piston defining a throttle between the inlet chamber and an outlet chamber in the direction of displacement of the pilot valve, one of said pistons defining a throttle between the inlet chamber and the outlet chamber opposite to the displacement of the pilot valve.

4 Claims, 10 Drawing Figures

DEVICE FOR AUTOMATICALLY CUTTING OFF DAMAGED BRANCHES OF PNEUMATIC AND HYDRAULIC SYSTEMS

FIELD OF THE ART

The invention relates to protection devices for systems filled with a working fluid under pressure, and more specifically, to devices for automatically cutting off damaged branches of pneumatic and hydraulic systems.

The invention may be most advantageously used in braking systems of vehicles, in pneumatic, hydraulic and fuel supply systems of aircraft and in hydropneumatic servosystems of stationary installations.

STATE OF THE ART

It is well known to those skilled in the art of protection devices for pneaumtic and hydraulic systems that two conflicting requirements are imposed on their design. First, a protection device should ensure a rapid filling of branches and units of the system connected thereto. Second, the protection device should have maximum possible sensitivity for instantly cutting off a branch of the system in case any damage occurs. This conflict has not been so far resolved to an adequate extent in any of conventional devices.

Known in the art is a safety valve for cutting off damaged branches of a pneumatic system (cf. FRG patent specification No. 1,282,392), comprising a hollow casing having inlet and outlet ports, a piston in the inner space of the casing and springs holding the piston in neutral position during normal operation of the pneumatic system. The piston divides the inner space of the casing into two chambers each communicating with a branch of the system through the outlet port and with the inlet, through constant discharge throttle passages. Upon any damage to the branch of the pneumatic system, pressure in a respective chamber of the casing drops, the piston overcomes the resistance of the springs under the action of the pressure difference so that it moves and shuts-off the passage connecting this chamber to the outlet.

The above-described valve is rather sensitive as the cross-sectional area of the inlet ports is small, hence the device reliably operates for cutting off a damaged branch in case the air flow rate through a damaged point is at least equal to the flow rate through the inlet port (that is in case the size of the inlet port does not exceed the size of the damage).

The provision of the inlet ports in the form of constant discharge throttle passages, however, limits the rate of filling of the branches with working fluid, hence the speed of operation of pneumatic units, which, in certain applications, such as in braking systems, is extremely undesirable.

Known in the art is a device for cutting off damaged branches of a hydraulic system (cf. French patent specification No. 2,076,856), comprising a hollow cylindrical casing having an inlet port in the peripheral wall and outlet ports in the end walls, and a pilot valve axially movable in the casing.

The pilot valve has a piston rod with two pistons at the ends thereof. When the pilot valve is in its extreme positions, the pistons alternately define shut-off valves with the end walls of the casing. The piston rod is mounted in a guide. The device is provided with two cylindrical springs holding the pilot valve in neutral position, which are installed between the guide and the pistons. The diameter of each piston in smaller than the diameter of the inner space of the cylindrical casing, and fluid flows from the inlet port to the outlet ports through the spaces between the pistons and the peripheral wall of the casing.

During normal functioning of the system the hydraulic resistance of the pistons results in appearance of mutually balancing axial forces. In case one of the branches is damaged all fluid flows to the damaged point, and the forces resulting from the hydraulic resistance of the pistons cause the pilot valve to shift to an extreme position. A respective piston of the pilot valve shuts off the outlet port, and the undamaged branch of the hydraulic system continues to function normally.

Compared to the first device described above, this device is much simpler and ensures more rapid filling of branches and units of the hydraulic system as the cross-sectional area of the annular space is much greater than the cross-sectional area of a passage in the valve body.

However, along with obvious advantages, this device also has certain disadvantages. In particular, the sensitivity of the device is rather low which is due to a great cross-sectional area of the space between the piston and casing.

SUMMARY OF THE INVENTION

A principal object of the invention is to provide a device for automatically cutting off damaged branches of pneumatic and hydraulic systems which combines in itself high sensitivity and ensures a rapid filling of the branches with working fluid.

Another important object of the invention is to provide a device for automatically cutting off damaged branches of pneumatic and hydraulic systems which is more reliable in operation than conventional devices.

A secondary object of the invention is to reduce the aerohydraulic resistance of the device for cutting off damaged branches of systems.

The above objects are accomplished by the provision of a device for automatically cutting off damaged branches of pneumatic and hydraulic systems, comprising a casing having an inlet chamber and outlet chambers communicating with one another through a passage incorporating a pilot valve which is axially movable therein and has a piston rod with pistons secured at the ends thereof, the pistons defining with the casing shut-off valves of the outlet chambers, wherein, according to the invention, the pilot valve is loosely mounted and has at least one additional piston with a cross-sectional area which is smaller than the cross-sectional area of each of said pistons, the additional piston defining a throttle between the inlet chamber and an outlet chamber in the direction of pilot valve movement, one of said pilot valve pistons defining a throttle between the inlet chamber and the outlet chamber located opposite to the direction of the pilot valve movement.

Loose arrangement of the pilot valve in the inner space of the casing enables a substantial improvement in the sensitivity of the device. This is possible owing to the fact that the pilot valve is held in a neutral position by one or another piston on the piston rod of the pilot valve, defining a throttle for the outlet chamber opposite to the direction of displacement in case of any accidental shift.

In case there is no damage working fluid freely flows from the inlet chamber to the branches of the system through the passage. When a damaged branch is cut-off, working fluid continues to flow freely to the undamaged branch.

The additional pilot valve piston of a size as described above also contributes to an improvement of sensitivity of the device for cutting off a damaged branch, the additional piston restricting the access of working fluid to the outlet chamber associated with the damaged branch.

Therefore, the above-mentioned factors ensure both high sensitivity of the device and an unobstructed filling of the system branches with working fluid.

Each pilot valve piston of the device preferably comprises of a seat secured to the piston rod and a perforated valve body urged by a spring against the seat from the end of piston rod and cooperating with a stop in the form of a projection of the inner surface of the casing defining the passage.

This construction of the pistons enables the simplest structure of communication of the inlet chamber and the outlet chamber associated with an undamaged branch upon cutting-off the damaged branch.

In one embodiment of the device each pilot valve piston may be rigidly secured to the piston rod and cooperate with a respective perforated elastic valve body urged against a seat provided on the inner surface of the casing defining the passage.

Rigid fastening of the pilot valve pistons to the piston rod and the provision of seats and elastic members simplify the pilot valve structure.

In another embodiment of the device the pilot valve has two additional pistons comprising projections at the end faces of the perforated valve bodies, which define, upon displacement of the pilot valve, a throttle between the inlet chamber and a respective outlet chamber.

In certain applications this enables a simplification of the manufacture.

High sensitivity is ensured in a device which has an actuating piston biased by springs at either end and having said passage incorporating the pilot valve, the actuating piston defining in its extreme positions with the casing and one piston of the pilot valve a shut-off valve of the outlet chamber.

The provision of the actuating piston in the device enables a substantial improvement of sensitivity of the device for cutting off a damaged branch.

The pilot valve piston rod is preferably provided with guide ribs in contact with the passage surface.

The provision of guide ribs on the piston rod of the pilot valve enables a desired coaxial arrangement of the pilot valve relative to the casing.

The invention will now be described with reference to specific embodiments illustrated in the accompanying drawings, in which.

Figure 1:
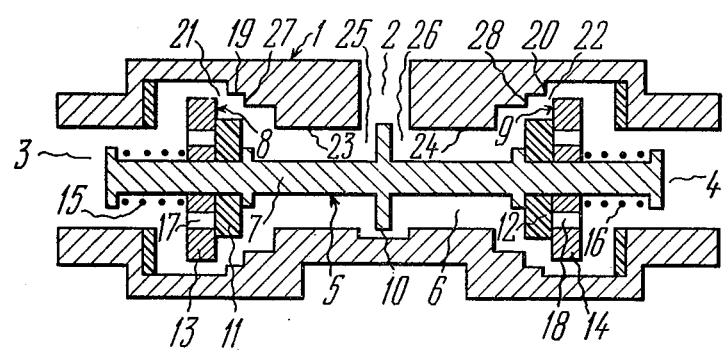
FIG. 1 is a longitudinal section of a device for automatically cutting off damaged branches of pneumatic and hydraulic systems with a pilot valve in neutral position, according to the invention (conjunction lines of various surfaces are not shown in this and other figures for the sake of clarity)

A device for automatically cutting off damaged branches of pneumatic and hydraulic systems has a casing 1 (FIG. 1) with an inlet chamber 2 and outlet chambers 3 and 4, and a pilot valve 5 arranged in a passage 6 through which the inlet chamber 2 communicates with the outlet chambers 3 and 4. The pilot valve 5 comprises a piston rod 7 and pistons 8 and 9. The pilot valve 5, according to the invention, is loosely mounted for an axial movement and comprises at least one additional piston 10 with a cross-sectional area which is smaller than that of each of the pistons 8 and 9.

In accordance with the preferred embodiment of the invention, the pistons 8 and 9 are mounted on the piston rod 7 and comprise seats 11 and 12 and perforated valve bodies 13 and 14 urged against the seats 11 and 12 by springs 15 and 16, respectively. Openings 17 and 18 of the perforated valve bodies 13 and 14 are shut-off or closed by the seats 11 and 12.

According to the invention, the valve bodies 13 and 14 of the pistons 8 and 9, when displaced to either side from the neutral position, define with projections 19 and 20 of the surface of the passage 6 throttles 21 or 22, respectively, between the inlet chamber 2 and the outlet chamber 3 or 4, which is opposite to the displacement.

According to the invention, the additional piston 10, upon a displacement of the pilot valve 5, also defines with portions 23 or 24 of the surface of the passage 6 a throttle 25 or 26 between the inlet chamber 2 and the outlet chamber 3 or 4 in the direction of movement of the pilot valve 5.

During the displacement of the pilot valve 5 the valve bodies 13 and 14 cooperate with projections (stops) 27 and 28 of the passage 6.

Figure 2:
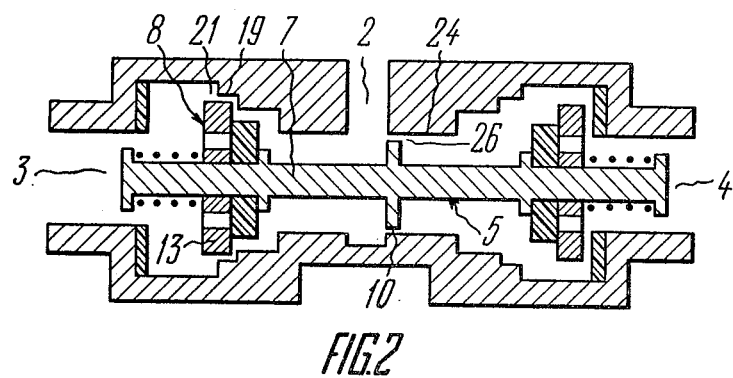
FIG. 2 shows the device of FIG. 1 upon an accidental displacement of the pilot valve.

FIG. 2 shows the device with the pilot valve 5 displaced to the right. As can be seen in the Figure, the perforated valve body 13 of the piston 8 defines, upon an accidental shift of the pilot valve 5 from neutral position, with the surface of the projection 19 a throttle 21 leading to the outlet chamber 3, while the additional piston 10 defines with the surface 24 a throttle 26 leading to the outlet chamber 4.

Figure 3:
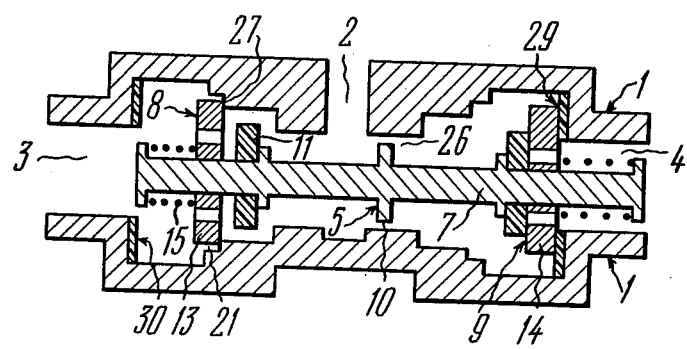
FIG. 3 shows the device of FIG. 1 with the pilot valve displaced into the extreme position at the moment when a damaged branch of the system is cut off.

The reference is now made to FIG. 3 of the accompanying drawings, in which the device is shown with the pilot valve 5 in the extreme righthand position at the moment the damaged branch of the system is cut off. As can be seen in this Figure, the perforated valve body 14 of the piston 9 defines with the casing 1 a shut-off valve 29. Similarly, the perforated valve body 13 of the piston 8 defines with the casing 1 a shut-off valve 30 when the pilot valve 5 is displaced into the extreme lefthand position.

Figure 4:
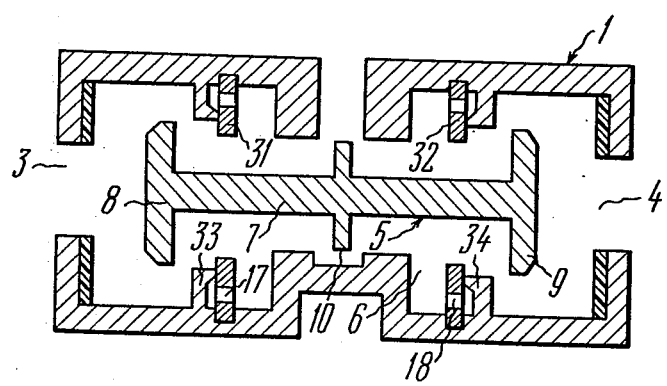
FIG. 4 shows an embodiment of the device having pistons rigidly secured to the pilot valve piston rod, according to the invention, with the pilot valve in neutral position.

In another embodiment of the invention, as shown in FIG. 4 of the accompanying drawings, each of the pistons 8 and 9 is rigidly secured to the piston rod 7 of the pilot valve 5 and cooperates with a respective perforated elastic valve body 31 or 32 urged against a seat 33 or 34 provided on the surface of the casing 1 defining the passage 6. When the pilot valve 5 is in neutral position, the openings 17 and 18 are shut-off by the seats 33 and 34.

Figure 5:
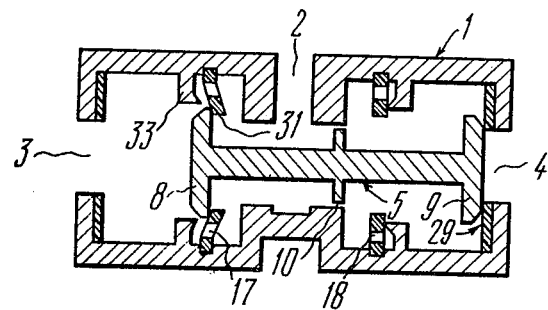
FIG. 5 shows the device of FIG. 4 at the moment when a damaged branch is cut off.

FIG. 5 shows the device of FIG. 4 with the pilot valve 5 in the extreme righthand position at the moment when the damaged branch associated with the chamber 4 is cut off. As can be seen in FIG. 5, the piston 9 defines with the casing 1 the shut-off valve 29, and the piston 8 engages the perforated elastic valve body 31 to separate it from the seat 33 thereby establishing a communication between the inlet chamber 2 and the outlet chamber 3 associated with the undamaged branch.

In another embodiment of the device (FIG. 6) the pilot valve 5 according to the invention has two additional pistons 35 and 36 provided at the outer end faces of the perforated valve bodies 13 and 14. In the illustrated embodiment, the additional pistons 35 and 36 comprise projections integrally extending from respective valve bodies 13, 14 and which are received in respective outlet chamber 3 or 4 upon displacement to define with walls 37 or 38 of the outlet chambers throttles 39 or 40.

Figure 7:
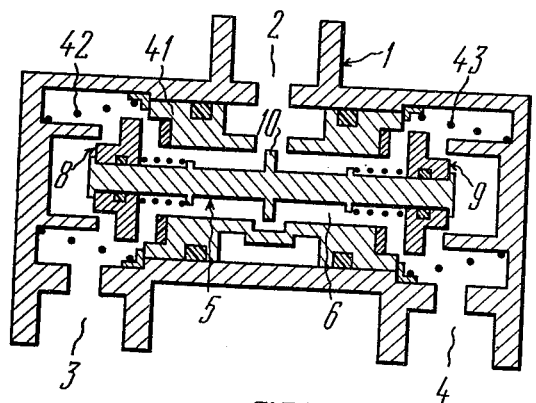
FIG. 7 shows an embodiment of the device in which the pilot valve is arranged in an actuating piston, according to the invention, and is in neutral position.

Maximum sensitivity is ensured in the embodiment of the device having an actuating piston 41 (FIG. 7) urged at the end faces by springs 42 and 43 and having the passage 6 incorporating the pilot valve 5. When the pilot valve is in neutral position, as shown in FIG. 7, the inlet chamber 2 communicates with the outlet chambers 3 and 4.

Figure 8:
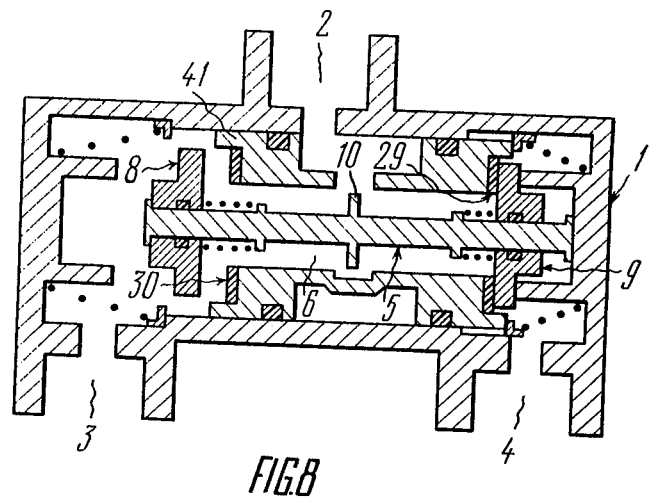
FIG. 8 shows the device of FIG. 7 at the moment when a damaged branch is cut off.

FIG. 8 shows the extreme righthand position of the actuating piston 41 corresponding to the cut off of a damaged branch, the actuating piston defining with the casing 1 and piston 9 the shut-off valve 29.

Similarly, the actuating piston 41 defines with the casing 1 and piston 8 of the pilot valve 5 the shut-off valve 30.

Figure 9:
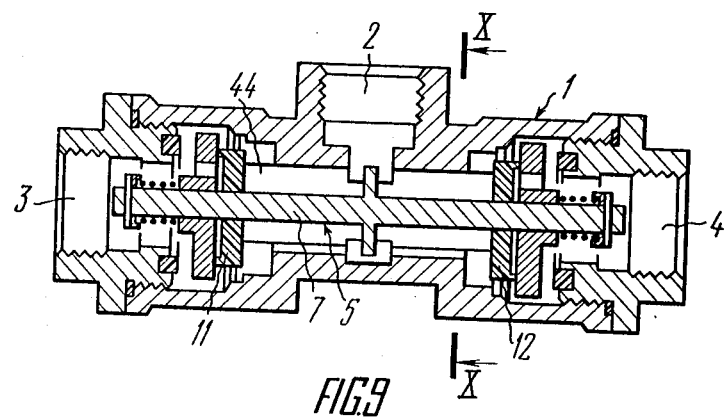
FIG. 9 shows an embodiment of the device in which the piston rod of the pilot valve is provided with guide ribs, according to the invention.
Figure 10:
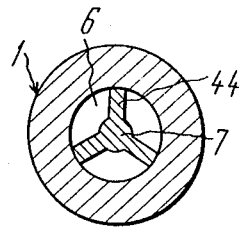
FIG. 10 is a sectional view taken along the line X—X in FIG. 9.

The pilot valve 5 may be aligned in the passage 6 of the device according to the invention by different means. In particular, guides receiving the ends of the piston rod 7 may be used, or internal supports with guide sleeves and the like (not shown in the drawings). The most preferred form of such means comprises the provision of guide ribs 44 (FIG. 9) on the piston rod 7 of the pilot valve 5. The guide ribs 44 are in contact with the surface of the passage 6 and are oriented as shown in FIG. 10.

The above described device functions in the following manner.

When the system is filled, working fluid is admitted from a control unit (not shown) through the inlet port 2 into the interior of the casing 1. When the pilot valve 5 is in neutral position as shown in FIG. 1 of the accompanying drawings, working fluid freely flows through the passage 6 to the outlet chambers 3 and 4 wherefrom it is fed to the branches of the system to actuators (not shown in the drawing). When the pilot valve 5 is in this position, the perforated valve bodies 13 and 14 are tightly urged by the springs 15 and 16 against the seats 11 and 12, and the openings 17 and 18 are shut-off or closed.

In case the pilot valve 5 is accidentally displaced during the initial period into an intermediate position (e.g. to the right) as shown in FIG. 2 of the accompanying drawings, working fluid is throttled in the throttle 21 defined by the perforated valve body 13 of the piston 8 with the projection 19 of the casing 1. At the same time, working fluid is throttled in the throttle 26 which is defined at the moment by the additional piston 10 with the surface 24. As the working fluid is throttled in the direction of both outlet chamber 3 and outlet chamber 4, the difference in the cross-sectional areas of the additional piston 10 and piston 8 results in an appearance of an axial force applied to the pilot valve 5 and directed towards the outlet chamber 3. This axial force is a resultant force of total pressure forces acting on the piston 8 and additional piston 10. Under the action of this axial force the pilot valve 5 is caused to displace to the left and, after a certain amount of oscillations, takes the neutral position. Immediately after the pilot valve 5 has moved into neutral position, the axial force disappears as the throttling of working fluid in the zone of the piston 8 and additional piston 10 is stopped, and there will be no further displacement of the pilot valve 5. Working fluid flows freely through the passage 6 to the outlet chambers 3 and 4 to fill the undamaged branches of the system.

When damage to one branch of the system occurs, such as to the branch associated with the outlet chamber 4, working fluid pressure in the branch, hence in the outlet chamber 4 abruptly drops. Under such conditions the device operates as shown in FIG. 3 of the accompanying drawings. In particular, as the working fluid flows to the undamaged branch connected to the outlet chamber 3 the piston 8 is subjected to a pressure on the side of the outlet chamber which is greater than the pressure acting on the piston 9 on the side of the outlet chamber 4. Under the action of this pressure difference the pilot valve 5 is displaced to the right, and the perforated valve body 13 defines with the projection 19 of the casing 1 the throttle 21 hampering the flow of working fluid from the undamaged branch to the damaged branch.

Concurrently, the additional piston 10 defines with the surface 24 the throttle 26 which abruptly reduces the flow of working fluid towards the outlet chamber 4. The pressure difference increases thus resulting in a further displacement of the pilot valve 5 to the right. The perforated valve body 13 cooperating with the stop 27 is stopped, and the piston rod 7 supporting the seat 11 and piston 9 continues to move to overcome the force of the spring 15. The seat 11 is spaced from the perforated valve body 13 to open the openings 17 through which working fluid freely flows from the inlet chamber 2 to the outlet chamber 3 and to the undamaged branch of the system. The perforated valve body 14 of the piston 9 approaches the end wall of the casing 1 to define with it the shut-off valve 29 thereby completely disconnecting the undamaged branch from the system. The pilot valve 5 is permanently held in the extreme right position under the action of the pressure difference between the damaged and undamaged branches.

In case one of the branches is damaged before working fluid is fed from a control unit, a minor difference in flow rates in the system branches at the beginning of the filling period cannot result in any displacement of the pilot valve 5. However, as the undamaged branch continues to be filled, the flow rate in this branch constantly decreases, whereas the flow rate increases in the damaged branch. The dynamic head values at the pistons 8 and 9 are different thus causing the displacement of the pilot valve 5 towards the damaged branch, in which the flow rate is greater. Further the device operates as described above.

The embodiment shown in FIG. 4 of the accompanying drawings operates in the same manner upon a displacement of the pilot valve 5.

In case one of the branches in the system is damaged, a displacement of the pilot valve 5 under the action of the pressure difference acting on the piston 8 and additional piston 10 (see FIG. 5) results in shutting-off the damaged branch and establishing a communication of the inlet chamber with the outlet chamber 3 through the openings 17 as a result of the perforated elastic valve body 31 being spaced apart from the seat 33.

Figure 6:
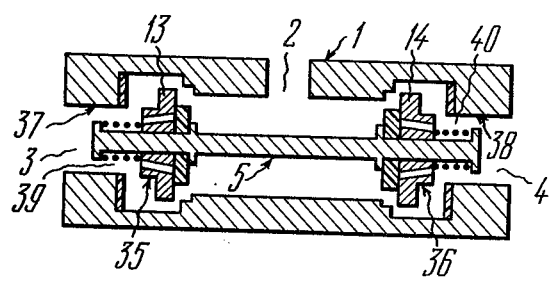
FIG. 6 shows an embodiment of the device having two additional pistons at the ends of the pilot valve, according to the invention.

In the device having two additional pistons 35 and 36 as shown in FIG. 6 of the accompanying drawings, an additional throttling is ensured by the formation of the throttle 39 or 40 defined by the surface 37 or 38 with the piston 35 or 36 upon a respective displacement of the pilot valve 5.

The embodiment shown in FIG. 7 functions in the same manner as that shown in FIG. 1, with the only difference that the pressure difference between the chambers 2 or 3 and 4 appearing upon a damage occurring to one branch causes a displacement of the pilot valve 5 which results in a displacement of the actuating piston 41 forming the shut-off valve 29 (FIG. 8).

Operability of the above-described embodiments of the device has been confirmed by laboratory tests.

What we claim is:

1. A device for automatically cutting off damaged branches of pneumatic or hydraulic systems, comprising: a casing having an inlet chamber and outlet chambers communicating with each other through a passage; stops provided within said casing in the form of projections inwardly extending from the side of the passage; a pilot valve arranged freely for axial movement in the passage of said casing and including a rod carrying at its ends main pistons which define with said casing shut-off valves of the outlet chambers when said pilot valve is in an axially displaced position, each of said main pistons including a seat secured to the rod of said pilot valve and a perforated shut-off member normally urged by a spring against said seat and interacting with a respective one of said stops upon movement of said pilot valve; an additional piston secured to the rod of said pilot valve between the main pistons and having an area smaller than the area of each of the main pistons, said additional piston defining together with said casing a throttle between the inlet chamber and the outlet chamber located in the direction of movement of said pilot valve, while the respective main piston of said pilot valve forms, together with said casing, a throttle between the inlet chamber and the outlet chamber located opposite to the displacement of said pilot valve.

2. A device for automatically cutting off damaged branches of pneumatic or hydraulic systems, comprising: a casing having an inlet chamber and outlet chambers communicating with each other through a passage; seats provided in said casing inwardly extending from the side of the passage; perforated resilient shut-off members secured in said casing and urged against said seats; a pilot valve arranged freely for axial movement in the passage of said casing and including a rod carrying rigidly secured at its ends main pistons which define together with said casing shut-off members of the outlet chambers when said pilot valve is in an axially displaced position, the interaction of said main pistons with said respective perforated shut-off members upon movement of the pilot valve; an additional piston secured to the rod of said pilot valve between the main pistons and having an area smaller than the area of each of the main pistons, said additional piston defining together with said casing a throttle between the inlet chamber and the outlet chamber located in the direction of movment of said pilot valve, while the respective main piston of said pilot valve forms, together with said casing, a throttle between the inlet chamber and the outlet chamber located opposite to the displacement of said pilot valve.

3. A device for automatically cutting off damaged branches of pneumatic or hydraulic systems, comprising: a casing having an inlet chamber and outlet chambers communicating with each other through a passage; stops provided within said casing in the form of projections inwardly extending from the side of the passage; a pilot valve arranged freely for axial movement in the passage of said casing and including a rod carrying at its ends main pistons which define together with said casing shut-off valves of the outlet chambers when said valve is in an axially displaced position, each of said main pistons including a seat secured to the rod of said pilot valve and a perforated shut-off member normally urged by a spring against said seat and interacting with a respective one of said stops upon movement of said pilot valve; two additional pistons in the form of projections integrally extending from the end faces of respective ones of the perforated shut-off members of the main pistons and having an area smaller than the area of each of the main pistons, said additional pistons defining together with said casing a throttle between the inlet chamber and the outlet chamber located in the direction of movement of said pilot valve, while the respective main piston of said pilot valve forms, together with said casing, a throttle between the inlet chamber and the outlet chamber located opposite to the displacement of said pilot valve.

4. A device for automatically cutting off damaged branches of pneumatic or hydraulic systems, comprising: a casing having an inlet chamber and outlet chambers communicating with each other through a passage; an actuating piston arranged in the passage of said casing and biased by springs at the end faces thereof; a pilot valve arranged freely for axial movement in the passage of said casing including a rod carrying at its ends spring-biased main pistons which define together with said casing and the end faces of said actuating piston shut-off valves of the outlet chambers when said actuating piston is in an axially displaced position; an additional piston secured to the rod of said pilot valve between the main pistons and having an area smaller than the area of each of the main pistons, said additional piston defining together with said actuating piston a throttle between the inlet chamber and the outlet chamber located at the direction of movement of said pilot valve, while the respective main piston of said pilot valve forms, together with said actuating piston, a throttle between the inlet chamber and the outlet chamber located opposite to the displacement of said pilot valve.

* * * * *